UNITED STATES PATENT OFFICE.

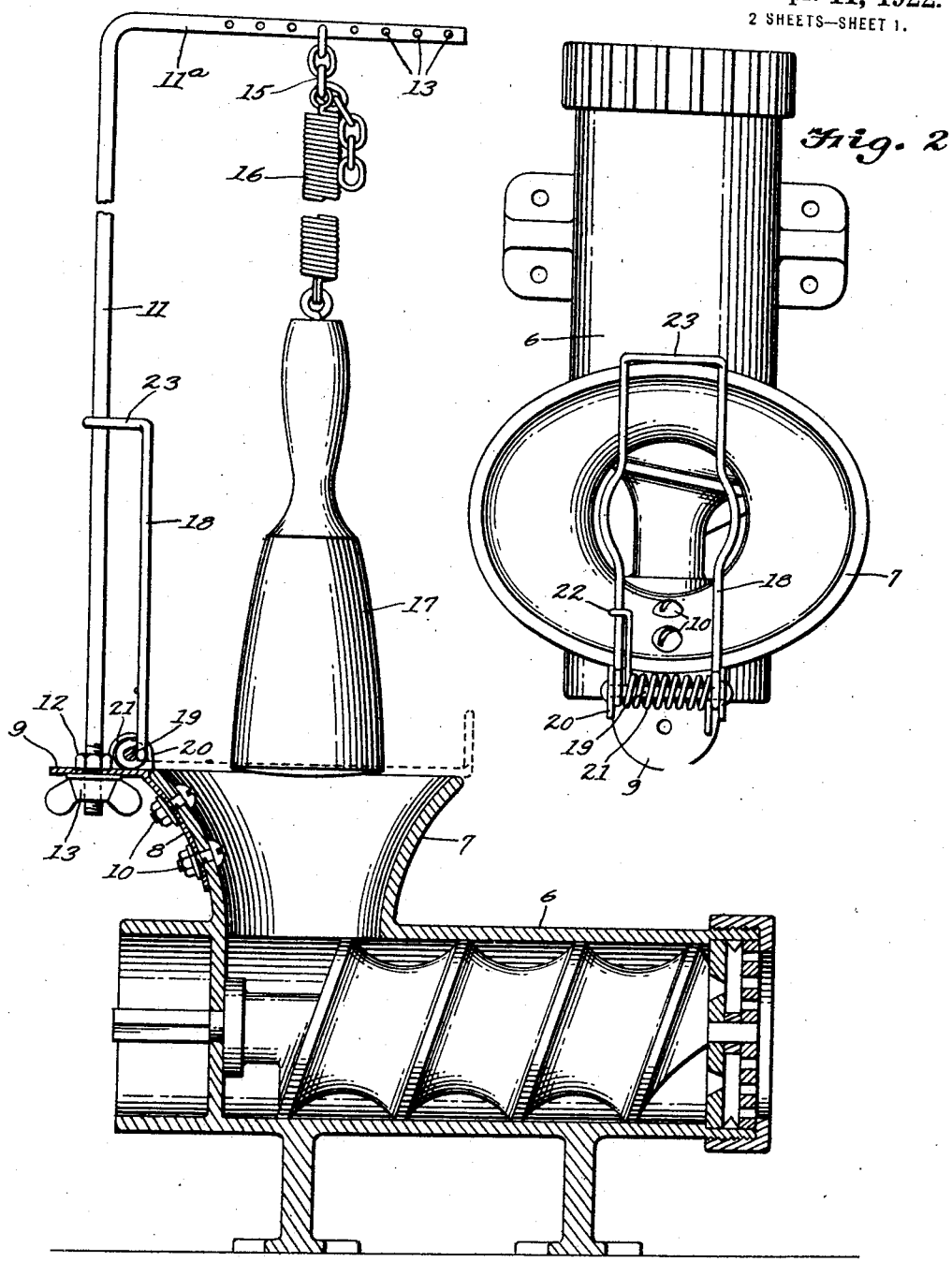

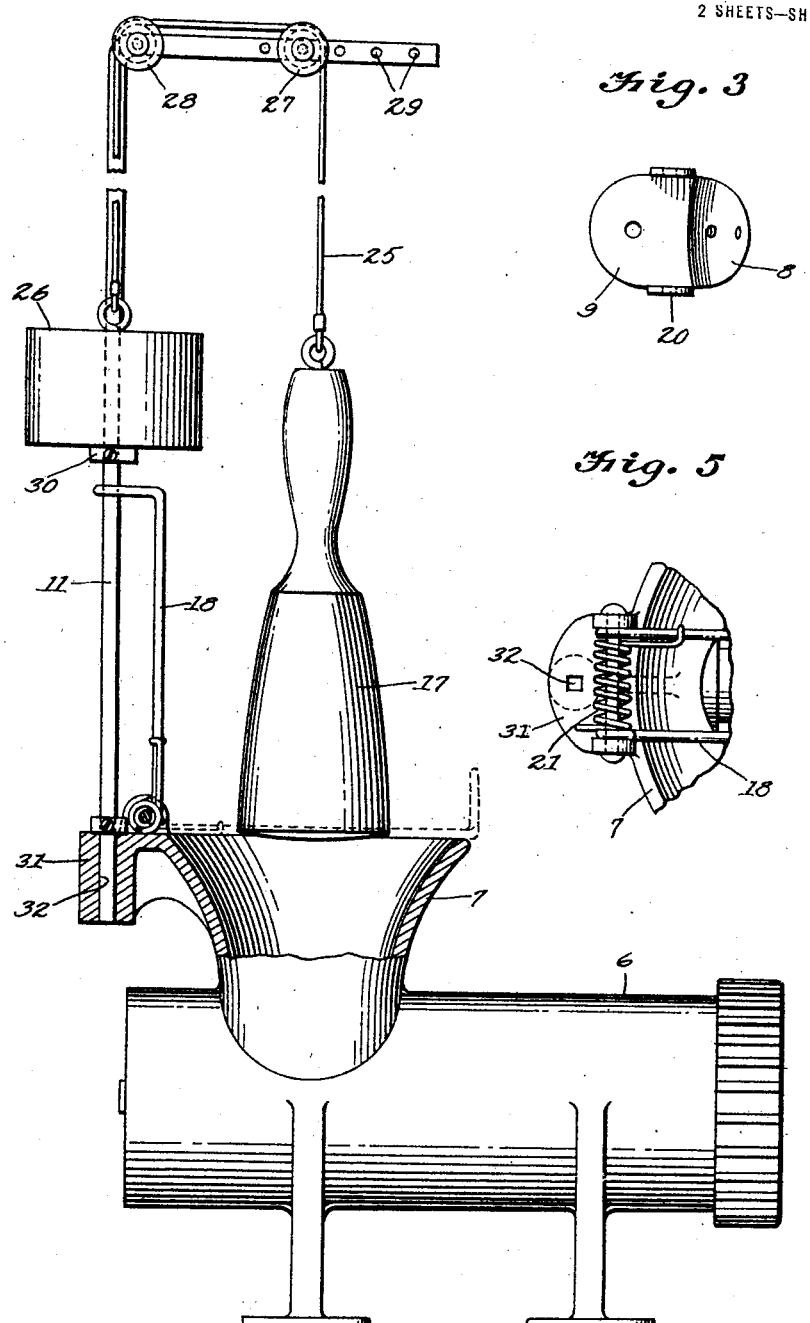

MICHAEL MAYER, OF CLEVELAND, OHIO.

SAFETY ATTACHMENT FOR MEAT GRINDERS.

1,412,536.  Specification of Letters Patent.  Patented Apr. 11, 1922.

Application filed July 6, 1921. Serial No. 482,772.

*To all whom it may concern:*

Be it known that I, MICHAEL MAYER, a subject of the Government of Jugo-Slavia, residing at Cleveland, in the county of Cuyahoga and State of Ohio, have invented certain new and useful Improvements in Safety Attachments for Meat Grinders, of which the following is a specification.

This invention is an attachment for meat grinders and the like, and has for its object to provide a device which will prevent accidental injury to the operator in feeding meat or other material into the machine. The device is applied particularly to that type of meat grinders in which the meat is fed through a hopper to a feeding screw, and the danger exists that the fingers of the operator may be caught by the screw and mutilated. To prevent this, I provide a tamping plunger which is used to force the meat down into the hopper, this plunger being supported in such manner that it can be moved up and down by the operator. In connection with this, or in addition to it, I provide a spring device which, when the tamping attachment is removed from the machine, will snap down over the mouth of the hopper and obstruct the same, so that a person cannot unintentionally get his fingers caught in the machine.

The invention is illustrated in the accompanying drawings in which Fig. 1 is a side elevation of the attachment, the meat grinding machine being shown in section. Fig. 2 is a top plan view. Fig. 3 is a plan of the bracket by which the attachment is secured to the hopper of the grinder. Fig. 4 is a side elevation of a modified device, and Fig. 5 is a detail of a modified bracket.

Referring to the drawings, 6 indicates a grinding machine of any suitable type having a hopper 7 into which the meat or other material is fed. The details of this machine are immaterial to the present invention, and require no further description. Attached to the side of the hopper 7 is a bracket consisting of a side plate 8 properly curved and shaped to fit against the outside of the hopper, and a top plate 9, which supports the attachment. The bracket is fastened to the hopper by screws 10. The plate 9 of the bracket supports an upright rod 11 secured to the bracket by nuts 12 and 13, the latter being removable to permit the attachment to be taken off. The standard 11 is overhung at the top, as indicated at 12, and may have a number of holes 13 for adjusting the connection of a chain 15 attached to the upper end of the spring 16 to the lower end of which the plunger or pounder 17 is loosely connected in position to hang directly over the hopper.

The manner of use is obvious: the meat or material is fed into the hopper with one hand and pounded or pushed down into the same by means of the plunger in the other hand. This avoids any necessity for the fingers of the operator being placed within the hopper.

To obstruct the mouth of the hopper when the attachment is removed I provide a spring yoke 18 which is pivoted by a pin 19 between ears 20 projecting from the top plate 9 of the bracket, with a spring 21 coiled around the pin and bearing against one of the arms of the yoke as indicated at 22 with a tendency to snap the yoke down upon the hopper as indicated in dotted lines in Fig. 1. When the attachment is in place this is prevented by the standard 11 which engages the cross piece 23 of the yoke and holds the latter in open position, against the tension of the spring. When the standard is removed the yoke will snap down over the hopper and make it quite inconvenient for a person to feed meat into the hopper under such conditions.

In the form shown in Fig. 4, the general construction is the same as that above described except that the plunger 17 is connected by a cable 25 to a weight 26 which slides up and down on the rod 11, the cable passing over pulleys 27 and 28 supported by the standard, the pulley 27 being adjustable by moving its shaft to one or other of the holes 29 in the overhanging part of the standard to properly center the plunger with respect to the hopper. A collar 30 on the standard limits the drop of the weight, which slightly overbalances the weight of the plunger. Also, instead of the bracket 8 and 9, I provide a boss 31 cast on the hopper with a socket 32 to receive the lower end of the standard, and the ears for the pivot of the yoke 18 being formed on the boss. The other parts are the same as above described. The device is particularly applicable to meat cutters, but is capable of use on cutters of any kind employing a feeding hopper or its equivalent.

I claim:

1. The combination with a feeding hopper, of a standard projecting above the same, a hand operated plunger yieldingly suspended from said standard and adapted to force material into the hopper, and a pivoted guard mounted on the hopper and adapted to close down upon the same, said guard being engaged and held open by the standard when the latter is in place.

2. The combination with a feeding hopper, of a standard projecting above the same, a hand operated plunger yieldingly suspended from said standard and adapted to force material into the hopper, and a spring actuated guard pivoted upon the hopper and tending to close down upon the same, said guard being engaged by the standard and held in open position against the tension of the spring when the standard is in position on the hopper.

In testimony whereof, I do affix my signature in presence of two witnesses.

MICHAEL MAYER.

Witnesses:
JOHN A. BOMMHARDT,
BESSIE F. POLLAK.